Jan. 10, 1956     W. H. SCHWIDETZKY     2,729,972

MECHANICAL RESONANCE DETECTION SYSTEMS

Filed Jan. 22, 1953     3 Sheets-Sheet 1

INVENTOR:
Walter H. Schwidetzky
BY
ATTORNEY

United States Patent Office 2,729,972
Patented Jan. 10, 1956

2,729,972

MECHANICAL RESONANCE DETECTION SYSTEMS

Walter H. Schwidetzky, San Diego, Calif., assignor, by mesne assignments, to General Dynamics Corporation, a corporation of Delaware Application January 22, 1953, Serial No. 332,677

9 Claims. (Cl. 73—67)

The present invention relates to mechanical resonance detection systems and more particularly to systems for detecting mechanical resonance by measuring and indicating phase differences between a driving signal and mechanical vibrations induced thereby.

One of the most critical problems confronting designers of structural elements subject to repeated or recurring shock loads is resonant mechanical vibrations induced therein. This problem is particularly acute in the design of aircraft parts, for example, since such resonant vibrations may build up to sufficient magnitude in flight to cause failure of the element itself with the ensuing probability of destruction of the aircraft. To alleviate this danger, it has long been the custom to subject various aircraft elements to wide frequency ranges of shock loading and, simultaneously therewith, measure the ensuing metal deformations appearing at different points along its structure. For example, a wing may be mounted and the tip thereof subjected to a mechanical vibration slowly varying in frequency from one to a hundred cycles a second. Then, a series of strain detection devices placed along the contour of the wing would each continuously respond to the mechanical deformations appearing at its particular location. The output signals from these devices representing the various deformations would be applied, for example, to an oscilloscope, with the resulting images thereof being photographically recorded on film. Then, the resulting recorded oscillations could be visually compared at the conclusion of the test to determine not only the amplitude of the various resonances but the particular frequencies at which such resonances occurred.

The film utilized to record the oscilloscope's output signal may, in practice, be several hundred feet in length. To determine the exact frequencies of resonance for each detection device, it is necesary to observe carefully the amplitude of the recorded signal and assume that the resonance points appear at maximum amplitudes. Such an observation is extremely tedious and rather involved owing to the length of record involved, and will produce, since the resonance points will be relatively broad, that is, the magnitudes of the recorded signals will vary only slightly from cycle to cycle, only an approximation of the maximum amplitude frequencies. Also, it is not always possible to accurately determine the precise resonant frequencies by such a method since definite deviations between reasonance and maximum amplitude occurs in highly damped systems.

Theoretically, it can be demonstrated for elastic systems, that at resonance a 90° phase shift occurs between the signal current inducing the driving force and the recorded output signal representing the vibration magnitudes at a particular point on the system. However, assuming the input vibration driving signal is recorded also, the determination of phase displacement between the input and recorded signals by conventional systems is even more difficult to achieve than merely observing amplitude variations owing to the extreme length of the record involved, the wide range of the input frequencies employed, and the necessity of continually comparing each cycle of the two signals for phase difference therebetween.

These difficulties in determining resonant frequencies by phase difference principles, according to presently used methods, are readily avoided by the devices according to the present invention. Several structural embodiments are disclosed, each of which produces an output signal, the magnitude of which represents a function of the phase difference between the vibration producing signal and the corresponding signal sensed by the strain detection devices. Thus, by varying the driving signal frequency and observing the magnitude of this sensed signal, the various points of resonance may be quite accurately determined by observing at what frequencies the signal magnitude excursions pass through a predetermined magnitude representing a 90° phase shift.

For example, in one embodiment of the present invention, a strain gauge bridge is excited with a carrier signal which, in turn, is modulated by the vibrations passing through the structural body at the point of the bridge's placement on the elastic body being tested. The carrier signal itself is applied to the driven signal input terminals of a first phase sensitive rectifier circuit, the other two or driving signal input terminals thereof being coupled to a variable frequency oscillator circuit supplying the vibrating signal. This phase sensitive rectifier circuit responds to all positive polarity portions of the applied driving input signal so as to pass the driven signal without polarity change as its output signal but acts to pass with inverted or reversed polarity, all portions of its input driven signal appearing coincidently with negative polarity portions of its input driving signal.

The resulting output signal of this first rectifier circuit is then applied to the two driving signal terminals of a second phase sensitive rectifier circuit similar to the first rectifier circuit, the two driven signal input terminals thereof being coupled to the modulated output signal of the strain gauge. The operation of this second rectifier circuit is similar to the first circuit and, by filtering the second circuit's output signal, a direct current signal is produced whose magnitude and polarity is a function of the phase displacement between the vibration producing signal and the modulation component of the carrier signal as sensed by the bridge. In particular, this function is a cosine one, hence requiring the scale of any voltmeter utilized for indicating the magnitude of this output signal to be calibrated on a cosine basis.

In this first embodiment, each of the rectifier circuits is purely electronic in nature, comprising transformers and diodes, while a second embodiment of the invention is illustrated wherein the electronic rectifier circuits of the first embodiment are replaced by relay phase sensitive rectifier circuits, the second embodiment being additionally utilized to explain the operation of the first embodiment. Also, a further embodiment of the present invention is set forth which employs a series of strain gauge bridges positioned along an elastic body with a recording voltmeter serving to record alternately the cosine and the sine functions of the phase displacement of each of the strain gauge output signals relative to the vibration driving signal. Both functions are recorded in order to alleviate the scaling ambiguity existing near the 0° values of the cosine and 90° values of the sine. The system also records, simultaneously with these phase angle functions, the vibration amplitudes sensed at each of the strain gauge bridges. In this way, not only are the phase differences visually recorded for easy determination of resonant frequencies, but corresponding therewith are also recorded the signal amplitudes.

As a final embodiment of the present invention, a resonance detection system is illustrated wherein the output signal is a linear, rather than a sine or cosine function, of the angle of phase difference. This is accomplished by, for example, in the first described embodiment, connecting a clipper circuit between the output modulated signal of the strain gauge bridge and the driven signal input terminals of the second phase sensitive rectifier circuit.

It is therefore, the principal object of the present invention to provide devices for determining resonant mechanical frequencies by measuring and indicating functions of phase differences between electrical signals representing mechanical vibrations.

Another object of the present invention is to provide devices for measuring and indicating phase differences between a driving signal inducing mechanical vibrations at a point on an elastic body and a signal representing the vibration of the body at another point.

A further object of the present invention is to provide devices for continuously measuring and indicating the phase differenec between a driving signal and a signal representing mechanical vibrations induced thereby in an elastic body as the driving signal frequency is continuously varied.

Still another object of the present invention is to provide devices for determining the resonant frequencies of an elastic body by measuring and indicating a function of the phase difference between a driving signal inducing mechanical vibrations at one point on the elastic body and a signal representing the resultant mechanical vibrations at another point on the body.

Still another object of the present invention is to provide a phase indicating system employing a pair of phase sensitive rectifier circuits.

A further object of the present invention is to provide devices for continuously indicating phase differences between a pair of signals of like frequency, one of the signals appearing as a modulation component on a carrier signal, said device employing a pair of phase sensitive rectifier circuits.

A still further object of the present invention is to provide devices for indicating the phase differences between the envelope of a carrier modulated signal sensed by a strain detecting element placed on the surface of an elastic body, and the signal producing the mechanical vibrations which modulated the detecting element's output signal.

Another object of the present invention is to provide a device for continuously recording the phase differences between a driving signal producing mechanical vibrations on an elastic body and the resulting mechanical vibrations appearing at a series of points on the body.

A still further object of the present invention is to provide a multiple channel mechanical resonance detecting system for use with an elastic body wherein each of the channels produces a record of the phase difference between a signal representing the vibration of the body at its location thereon and the driving signal inducing the vibration as well as a record of the amplitude of the vibration representing signal.

Other objects and features of the present invention will be readily apparent to those skilled in the art from the following specification and appended drawings wherein is illustrated a preferred form of the invention, and in which.

Figures 1, 2, 4, 10:
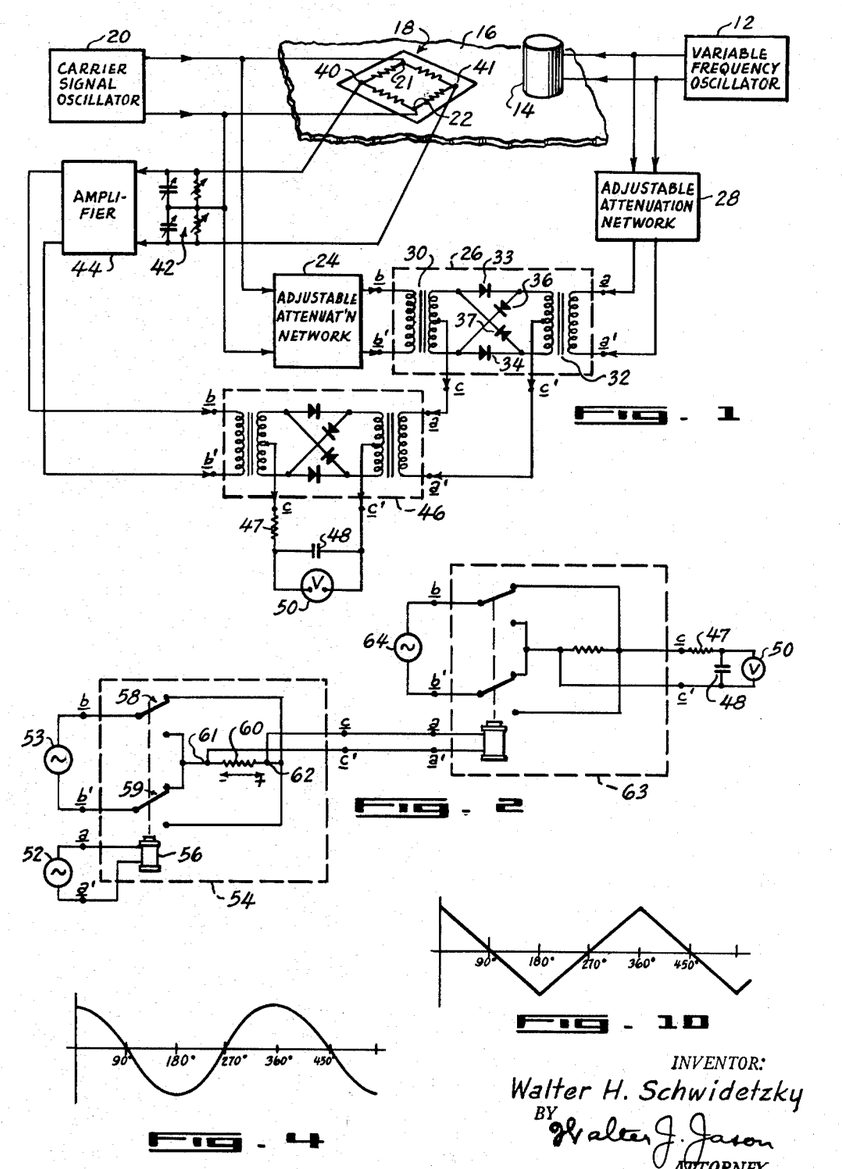
Fig. 1 is a circuit diagram partly in block schematic and partly in perspective form illustrating one embodiment of a mechanical resonance detection system according to the present invention.
Fig. 2 is a circuit diagram of another embodiment of the present invention as it relates to the circuit of Fig. 1.
Fig. 4 is a curve serving to illustrate the mode of operation of the devices of Figs. 1 and 2.
Fig. 10 is a curve serving to illustrate the mode of operation of the device of Fig. 8.

Referring now to the drawings, there is illustrated in Fig. 1 a single channel resonance detection system according to the present invention. The output signal, termed the driving signal, of a variable low frequency oscillator 12 is applied to a vibrator 14, vibrator 14 being placed adjacent to an elastic body, generally designated 16, to impart a mechanical vibration thereon having the same frequency as the output signal produced by oscillator 12. An element for detecting changes in stress and strain, such as a four element strain gauge bridge, generally indicated as 18, is affixed in conventional manner to the surface of body 16 and receives on two of its opposite terminals, 21 and 22, a carrier signal produced on the two output terminals of a carrier signal oscillator 20. As will be apparent to those skilled in the art, other types of sensing devices such as transducer potentiometers, differential transformers, variable reluctance pickups, etc., may be used instead of the specifically herein illustrated strain gauge bridge 18.

The output signal of carrier oscillator 20 is also applied through an adjustable attenuation network 24 to the two driven signal input terminals, designated $b$ and $b'$, of a phase sensitive rectifier circuit 26. Also, the output signal of oscillator 12 is applied through an adjustable attenuation network 28 to the two driving signal input terminals, designated $a$ and $a'$, of rectifier circuit 26. Circuit 26, in turn, includes an iron core transformer 30 whose primary winding ends are connected to the $b$ and $b'$ terminals and another transformer 32 whose primary winding ends are connected to the $a$ and $a'$ input terminals. In addition, the two ends of the secondary winding of transformer 30 are coupled to the anodes of diodes 33 and 34, the cathodes of which are coupled to the two corresponding ends of the secondary winding of transformer 32. Also, the opposite secondary winding ends of transformers 30 and 32 are cross-coupled through diodes 36 and 37. The secondary windings on both transformers are center-tapped with the ouput signal terminals, designated $c$ and $c'$, of circuit 26 being connected to the center taps of transformers 30 and 32, respectively.

Returning now to strain gauge bridge 18, the remaining two opposite terminals 40 and 41, across which appear the sensed or pick-up signal, thereof are coupled through a conventional bridge adjusting network, generally designated 42, to the two input terminals of an amplifier 44. The output terminals of amplifier 44 are, in turn, coupled to the driven signal input terminals, also designated $b$ and $b'$ for convenience, of another phase sensitive rectifier circuit 46, circuit 46 being similar in all respects to the previously described rectifier circuit 26.

The output terminals $c$ and $c'$ of circuit 26 are coupled to the driving signal input terminals, designated $a$ and $a'$, of circuit 46 with the output terminal $c$ of circuit 46 being coupled serially through a resistor 47 to one terminal of a voltage indicating device, such as voltmeter 50, with the other output terminal $c'$ being connected to the other terminal of voltmeter 50. A capacitor 48 is coupled across voltmeter 50 and it, in conjunction with resistor 47, forms a low pass filter network.

The primary purpose of this system is to detect the exact mechanical resonant frequencies at a point on an elastic body over a mechanical vibration frequency range of one to a hundred cycles a second, for example, by continuously indicating the phase differences between the initially produced vibrations and the vibrations at the given point. Vibrator 14 acts, in a manner according to the well known acoustic loud speaker principle, to transform the varying low frequency output signal of oscillator 12 into a corresponding mechanical motion. This motion, in turn, is applied to the surface of body 16 with the result that a series of transverse vibrational waves emanate radially from the point of contact therebetween. These vibrational waves are formed of alternate expansions and contractions of metal and proceed outwardly in a manner similar to ripples on a pond, for example.

These waves, traveling through and across body 16 will eventually be reflected at various points, such reflections being caused, for example, by discontinuities produced by welded joints, rivets, termination of the body, and different thicknesses of the material. These reflections, in turn, travel in an opposite direction from the original or initial waves produced by vibrator 14 and, under certain prescribed conditions and at certain points, will act to reinforce or have an inphase relationship with the original waves. When this occurs, then a resonant phenomenon is said to exist, this resonance differing from original waves produced by vibrator 14 in that the alternate expansions and contractions of the material produced thereby are much greater in magnitude. If these vibrations attain such a magnitude that the yield point of the body's material is exceeded, then permanent deformation thereof will take place with the possibility of breaks in and destruction of the body itself.

These alternate waves of contractions and expansions in passing strain gauge 18 will, in a manner commonly understood by those skilled in the art, cause corresponding lengthening and shortening of the individual arms thereof. These changes in length, in turn, cause changes in their normal resistances with the result that the carrier signal oscillator current, here preferably 3000 cycles per second in frequency, is alternately increased and reduced in accordance therewith, and appears across junctions 40 and 41 as a modulation component on the carrier signal. Although the system, as illustrated, will be primarily sensitive to longitudinal vibrations, it will be apparent to those skilled in the art that other vibrational modes may be sampled by bridge 18 as determined by the particular configuration of body 16, the location of the bridge, and the type of vibration produced by vibrator 14.

As will also be understood from resonant phenomenon, any given point on body 16 may be susceptible to resonance at several different input driving frequencies. Also, the peak of each such resonant point may, in practice, be relatively broad and hence extend at substantially the same vibrational amplitude over an excursion of quite a few cycles of input driving frequency change. Now, the primary function contemplated for the phase detection system of Figure 1 is to make possible an accurate determination of these resonant frequencies by indicating, at all times, a function of the phase angle or difference existing between the input driving signal applied to vibrator 14 and its corresponding modulation component impressed on the output signal of strain gauge 18. Specifically, each of these resonant points will be marked by the phase angle passing through 90°. As will be appreciated, determination of resonance by phase comparison yields a much sharper and hence more accurate resonance point than that accomplished in comparing amplitude variations since the phase difference will undergo a sharper and hence more observable deviation.

In order to understand the manner in which the device of the present invention accomplishes this phase indication, it is first necessary to set forth in detail the operation of phase sensitive rectifier circuits 26 and 46. Once this is accomplished, then the operation of the entire system may be readily described.

However, the theory of operation of a phase sensitive rectifier circuit, providing certain required input signal parameter relationships are established and maintained, is an extremely difficult and elaborate thing to set forth. Such operation has been explained by means of an analogous electromechanical circuit herein termed a relay phase sensitive rectifier circuit, or more briefly, a relay rectifier circuit, which theoretically functions to produce the equivalent electrical result. It so happens, in this case, as will become apparent later, owing to the relatively low frequencies within the driving signal and hence modulation component range, this electro-mechanical circuit is not only useful for helping explain the operation of the electronic rectifier circuits, such as 26 and 46, but it itself may be substituted for circuits 26 and 46, and hence may be considered as another embodiment of the present invention.

Thus, referring now to Figure 2, there is illustrated a pair of relay rectifier circuits 54 and 63, corresponding in function and connected equivalently as circuits 26 and 46, respectively, of Figure 1. In particular, rectifier circuit 54 includes a relay 56 whose coil is connected to the driving signal or $a$ and $a'$ input terminals of the circuit. The driven signal input terminals $b$ and $b'$ of circuit 54 are connected to the movable switch arms of a pair of switches 58 and 59, respectively, the switch arms being simultaneously actuated by the relay coil to contact either a pair of respective upper switch contacts or a pair of respective lower switch contacts. The lower and upper switch contacts of switches 58 and 59, respectively, are connected to one terminal 61 of the resistor 60, the other terminal 62 of resistor 60 being connected to the upper and lower switch contacts of switches 58 and 59, respectively. The output terminals $c$ and $c'$ of circuit 54 are connected to terminals 61 and 62, respectively, of resistor 60. A source 52 of an alternating current signal is connected across input terminals $a$ and $a'$, while another source 53 of alternating current signals is connected across the $b$ and $b'$ terminals. In the interest of continuing the analogy between this portion of the circuit and its corresponding portion in the circuit of Figure 1, source 52 may correspond to variable frequency oscillator 12 and adjustable attenuation network 28. In the same manner, source 53 may correspond to carrier signal oscillator 20 and its associated attenuation network 24.

The $c$ and $c'$ output terminals of network 54 are connected to the $a$ and $a'$ input terminals of relay rectifier circuit 63, similar in all respects to circuit 54. In addition, a source 64 of alternating current signals is connected to the $b$ and $b'$ input terminals of circuit 63, source 64 corresponding to the strain gauge 18, bridge adjusting network 22, and amplifier 44 of Figure 1. As before illustrated in Figure 1, the low pass filter circuit comprising capacitor 48 and resistor 47 is connected between the $c$ and $c'$ output terminals of circuit 63 and voltmeter 50.

Figure 3:
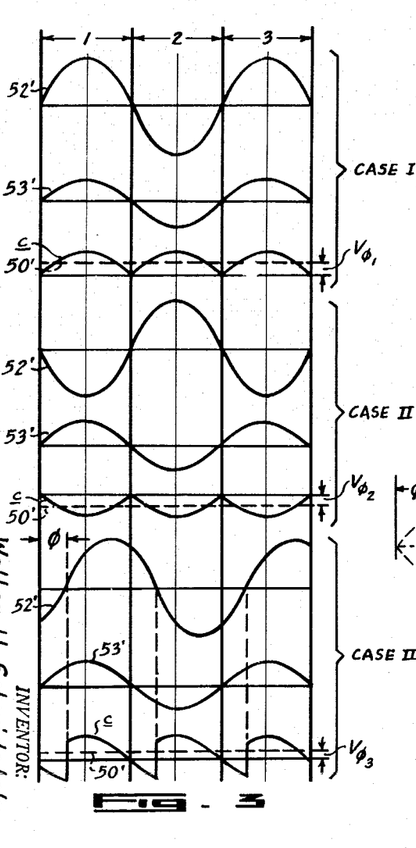
Fig. 3 is a group of waveforms illustrating the principles involved in the operation of one of the components of Figs. 1 and 2.

Before considering the operation of the entire system of Figure 1, it is first desirable to set forth the basic operation of a single rectifier circuit. Thus, there is illustrated in Figure 3 a group of signal waveforms illustrating the phase detection properties of circuit 54. In particular, there are three cases illustrated in Figure 3, Case I being where the two input signals are of the same frequency and have no phase displacement therebetween. In Case II, a 180° phase shift exists between the two input signals and in Case III, a phase difference of slightly less than 90° exists between the input signals.

Considering Case I, there is illustrated the output signal 52' of source 52 as is output signal 53' of source 53, both signals being only by way of example. Now, the winding direction of the coil in relay 56 is such that when driver input signal 52' is positive, as it is during the first illustrated half-period, then both switch arms of the two switches will be actuated by the coil to the upper contact positions. Thus, if the driven input signal 53' is positive at this time, as it is during the first half-period of Case I, an electron flow will take place through resistor 60 from terminal 61 to terminal 62. This direction of current flow, herein designated positive, through resistor 60 will, in turn, cause the signal c, appearing across terminals c and c' as illustrated in Figure 3, to be positive.

Then, during the second half-period illustrated for Case I, signal 52 reverses its polarity and goes negative with the result that relay 56 is actuated to pull the movable arms of switches 58 and 59 to engage the lower switch contacts. It is herein assumed that relay 56 is an ideal one, that is one which instantly switches from one switch position to the other upon reversal of current flow through its relay coil. This switching operation would normally cause a reversal of current flow through resistor 60, but, however, owing to the in-phase relationship between the two signals, signal 53' reverses its polarity simultaneously with the actuation of the switch arms with the result that once more the electron flow passes through resistor 60 in the positive or terminal 61 to 62 direction. Then, at the beginning of the third half-period illustrated for Case I, both of signals 52' and 53' again reverse polarity with the same result being achieved that is, signal c remaining positive, as was produced during the first half-period. The average value of signal c, as would be read by a voltmeter in conjunction with an appropriate filter circuit similar to that shown connected across the c and c' output terminals of circuit 63, is indicated by the dotted line 50'. This average value is of positive polarity having a designated magnitude of $V_{\varphi 1}$.

In Case II, as pointed out above, signals 52' and 53' are displaced 180° in phase with respect to each other and initially having negative and positive polarities, respectively. Thus, during the first half-period, the movable switch arms of switches 58 and 59 will be in their lower position with the result that, owing to the positive polarity of signal 53', the electron flow will take place through resistor 60 in the negative or terminal 62 to 61 direction with signal c correspondingly being negative. During the second half-period of Case II, the movable switch arms will be actuated at the instant driver input signal 52' goes positive but simultaneously therewith driven input 53 goes negative, the result being that once more a negative direction of current flow exists through resistor 60 with signal c remaining negative. The illustrated third half-interval is the same as the first one with signal c still remaining negative. The average value of signal c, in this example, as indicated by the dotted line 50' is of magnitude of $V_1$ and of negative polarity. As is apparent, the absolute magnitude of $V_{\varphi 1}$ for Case I is identical to the absolute magnitude of $V_{\varphi 2}$ in this Case II.

In Cases I and II are found the two extreme examples of phase difference, that is, 0° and 180° displacement. In Case III however, there is illustrated an example wherein the phase displacement lies between these two values. In particular, signal 52' lags signal 53' by a phase angle $\phi$, angle $\phi$ being slightly less than 90°. During the portion of the first half-period up to angle $\phi$, signal 52' and 53' are negative and positive, respectively, with the result that the movable switch arms of switches 58 and 59 are contacting their lower switch contacts and current flows negatively through resistor 60. Thus signal c is negative through angle $\phi$, at which time, signal 52' begins a positive polarity excursion. Upon this occurrence, relay 56 is energized to its other direction and since signal 53' is still positive, a positive direction of current flow takes place through resistor 60 with signal c switching instantaneously from a negative potential equal to the magnitude of signal 53' to a positive potential of the same magnitude.

Signal c remains positive until the end of this first half-period at which time, although signal 52' is still positive and the relay switch arms remain in the same position as formerly, signal 53' goes negative in polarity with the result that a negative current flow takes place through resistor 60 with signal c correspondingly going negative once more. This action continues until the relay is actuated in its opposite direction by signal 52' going negative at the angle $\phi$ past the beginning of the second half-period. When this occurs, signal c switches, as it did during the first half-period from a low to high potential, both having the absolute magnitude as signal 53' at that instant. Here, in Case III, the dotted line, signifying the average value $V_{\varphi 3}$ of signal c is slightly positive in magnitude.

It has thus been demonstrated that for the cases of no phase difference and for a 180° phase difference, the average direct current potential produced in each are equal in magnitude but of opposite polarity. Also, for a phase difference of slightly less than 90°, it has been demonstrated that an average potential of slightly greater than zero was obtained but considerably less than the absolute magnitude obtained in either of the previous cases. Since, as was pointed out previously, resonance is indicated by a 90° phase shift, then if the two signals 52' and 53' here taken by way of example, represented the driving and pick-up signals, respectively, then resonance would be indicated by a zero magnitude of signal c.

The operation of a phase sensitive rectifier circuit may be summarized in the following manner. The circuit is responsive to each positive polarity portion of the driving input signal for passing without polarity change the driven input signal as its output signal and is responsive to each negative polarity portion of the driving signal for passing as its output signal with a sign or polarity reversal the simultaneously appearing driven input signal.

If the phase difference between signals 52' and 53' were to be slowly varied from 0° to 180° with voltmeter 50 being observed simultaneously therewith, it would be found that the meter reading would vary from $V_{\varphi 1}$ to $V_{\varphi 2}$, the actual meter deflection, however, not being proportional to the angle of the phase difference, but rather to the cosine of the angle of the phase displacement. This signifies that the meter must be calibrated on a cosine rather than a linear scale and since, as is well known, cosine values close to 0° and 180° have little spread or deviation, the scale of the voltmeter would, within these ranges, be very condensed, hence making accurate voltmeter readings difficult to take. Another form of the present invention will be later described wherein the output signal is proportional to the angle rather than the cosine of the angle hence allowing the voltmeter scale to be linear.

Referring now to Figure 4, there is illustrated a curve showing the cosine function variation of $V_\varphi$ plotted against the phase difference between the two signals. Thus, as a 0° phase difference $V_\varphi$ will be a positive maximum and will decrease according to the cosine function to reach a zero value at 90° and then continue in a negative direction until a negative maximum is reached at 180°. At this point, the slope of the cosine curve changes and $V_\varphi$ increases until a zero value is reached at 270° and a maximum amplitude is reached at 360°, corresponding to the 0° case.

Figure 5:
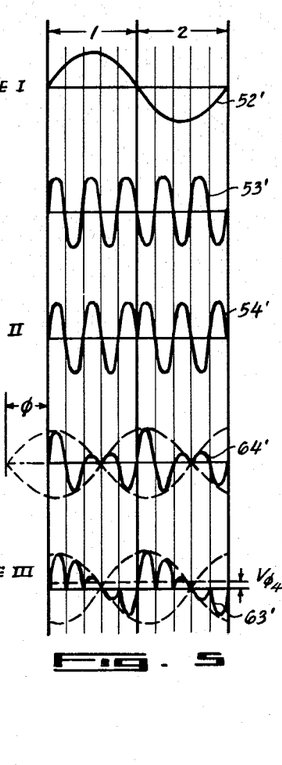
Fig. 5 is a group of signal waveforms illustrating the principles of operation of the devices of Figs. 1 and 2.

Having described in detail the operation of relay rectifier circuit 54, reference is now made to Figure 5 wherein is illustrated a group of signal wave forms illustrating the joint operation of circuits 54 and 63 as particularly directed to the operation of its equivalent and corresponding system as illustrated in Figure 1. First illustrated is one complete cycle of the driver input signal 52' as it is applied to the a and a' terminals of rectifier circuit 54 and representing, in this case, the output signal of oscillator 12 of Figure 1 as applied to vibrator 14.

It is of course assumed that signal 52' will exactly correspond in phase with the mechanical vibrations produced on body 16 by vibrator 14. This is true, in practice, if the waveform of signal 52' represents the current flow through the main vibratory coil of vibrator 14. If a voltage waveform is utilized and a time lag occurs between it and the induced vibrations, then, as will be appreciated by those skilled in the art, either a corresponding phase delay may be provided for this voltage waveform coming from oscillator 12, or the signal applied to attenuation network 28 may come directly, after appropriate amplification, from a transducer pickup located adjacent vibrator 14.

Next illustrated in Figure 5 is the driven input signal 53' applied to the *b* and *b'* input terminals of circuit 54, signal 53' being derived in Figure 1 from the carrier signal oscillator 20 and representing, in turn, the carrier signal applied across strain gauge bridge 18. The signal 54', next illustrated, is the output signal of relay rectifier circuit 54 as it appears across its output terminals *c* and *c'*.

Signal 54' is derived from the combination of signals 52' and 53' by circuit 54 in the manner explained previously in connection with the example given in Figure 3. Thus, during the first half-period illustrated, when signal 52' is positive, output signal 54' is identical to signal 53'. Then, during the second half-period when signal 52' is negative, signal 54' will be the inverse or complementary to signal 53' with the result that a phase reversal of the carrier signal will take place between the end and beginning of the first and second half periods. It will be here noted that since signals 52' and 53' are of entirely different frequencies, signal 54' is only the modulation product of the two, it having no significance as far as phase difference is concerned.

Next illustrated in Figure 5 is signal 64' as applied to the *b* and *b'* input terminals of circuit 63 and representing, from Figure 1, the output signal of strain gauge 18 as amplified by amplifier 44. It comprises, as before stated, the carrier signal of the same frequency and phase as that produced by oscillator 20 but modulated in accordance with the mechanical deformations of body 16 at the point of the strain gauge location.

Before proceeding further, it is desirable to consider in more detail the modulation characteristics demanded of the carrier signal output of oscillator 20 by the vibration of body 16. Briefly, the highest possible amount of modulation, termed carrier suppressed modulation, is required in order that a phase reversal of the carrier signal take place every half-period of the vibration signal. This modulation requirement is readily met in practice, as will be appreciated by those skilled in the art, by applying only the carrier signal to the bridge 18, and then adjusting the bridge adjusting circuit 42 such that a zero valued signal is applied to amplifier 44. With this accomplished, then any low frequency vibration components applied to the bridge will automatically produce a carrier suppressed modulation of the carrier signal. After the above adjustment has been made, any further changes of the carrier signal amplitude will not cause any deviation from the zero valued input signal to the amplifier.

As stated previously, signals 54' and 64' are applied to the *a* and *b* pairs of input terminals, respectively, of circuit 63. The output signal 63' of circuit 63 is illustrated as it appears on *c* and *c'* output terminals thereof, the wave shape of signal 63' being obtained in the manner previously explained in connection with Figure 3. The average value of signal 63' produced by the filtering action of resistor 47 and capacitor 48 and indicated by voltmeter 50, comprises a direct current potential having a magnitude $V_{\theta_4}$. The magnitude of this potential represents a function of the phase difference between signal 52' and the envelope of the strain gauge output signal 64', the particular function being, as stated previously, a cosine one.

Returning now to the operation of the electronic phase sensitive rectifier circuits illustrated in Figure 1, it has been stated that the relay circuits of Figure 2 furnish not only another embodiment of the present invention but also serve to illustrate the manner in which these electronic circuits operate. This is true only if, as stated before, certain input signal relationships are maintained in the operation of the circuits of Figure 1. The most important restriction is that the magnitude of the driver input signal, that is, the signal applied across the *a* and *a'* terminals, be greater than the corresponding driven input signal applied across the *b* and *b'* input terminals. This is required since the driver input signal should act as an overriding signal to effectively control the current conduction through the various diodes.

In practice, the value of the driver input signal may be quite readily made larger than the driven input signal in several ways, the particular manner herein disclosed being by use of the adjustable attenuation networks 24 and 28 as shown in Figure 1. With regard to circuit 46, the amount of amplification produced by amplifier 44 may be controlled so as to make the driven signal applied to the *b* and *b'* terminals less than the value of the output signal appearing on the *c* and *c'* terminals of circuit 26. With this accomplished, then the device of Figure 1 will operate as described in connection with the circuitry of Figure 2.

As will be readily apparent, other means exist for varying this magnitude relationship between the driver and driven input signals. For example, the turns ratio between the the primary and secondary windings of transformers 30 and 32 may be so selected with respect to each other and their input signal magnitudes so as to produce across the secondary windings thereof signals having the proper magnitude relationships.

Certain other limitations and restrictions are required for the circuits of both Figure 1 and Figure 2 to function properly and produce the above stated results. The carrier signal should have the same frequency wherever it appears and is utilized. Also, the modulation signal as produced by oscillator 12 should be of the same frequency whenever encountered, its phase, of course, being the variable to be determined. Also, the carrier signal as sensed by the bridge should invariably have the same constant phase angle with respect to the original carrier signal produced by oscillator 20 and applied to circuit 26 and this phase angle should preferably be as close to 0° as possible for purposes of maximum efficiency. Furthermore, the output signal of rectifier circuit 26, which may be denoted the reference signal, should be of carrier suppressed modulation so that phase reversal of the carrier signal will occur for every half-period of the modulation component signal. If these restrictions are imposed and maintained in both circuits according to Figures 1 and 2 along with the additional restrictions mentioned previously in connection with Figure 1, then the operation as described and set forth in connection with the signal wave forms, taken by way of example, in Figures 4 and 5, will take place.

The identical function performed by the circuits of Figures 1 and 2 may be readily accomplished by interchanging certain of the input signal connections. For example, the output signal of amplifier 44 could be coupled to the driven signal or *b* and *b'* input terminals of circuit 26 while the output signal from carrier signal oscillator 20 could be coupled through attenuation network 24 to the driver signal or *a* and *a'* input terminals of circuit 26. The output terminals of rectifier circuit 26, in turn, could be coupled to the driven signal input terminals of rectifier 46, with the output signal of variable frequency oscillator 12 applied through attenuation network 28 to the driver signal input terminals thereof. No change in the final operation of the circuit will be produced by these input connection changes as may be demonstrated in the manner set forth for describing the operation of the circuits of Figures 1 and 2.

The principal advantage present in the connections shown in Figures 1 and 2 is that a series of vibration detection devices, as included in a series of channels could be employed along the surface of body 16 with only a single circuit 26 being required for all of the channels thereof. With the input connections interchanged as above, a circuit, corresponding to circuit 26, would be required for each channel thereby resulting in an increased circuit complexity. This advantage will be realized more fully in connection with the circuit of Figure 6 wherein a multiple channel system is illustrated.

Also, the system, as illustrated, has the further advantage that modulation frequencies down to a direct current level can be handled owing to the fact that the transformers within the circuit 46 essentially operate at carrier frequency. This, in turn, facilitates the problem of grounding since one terminal in each of the three pairs of input and output terminals may be connected directly to ground.

Figure 6:
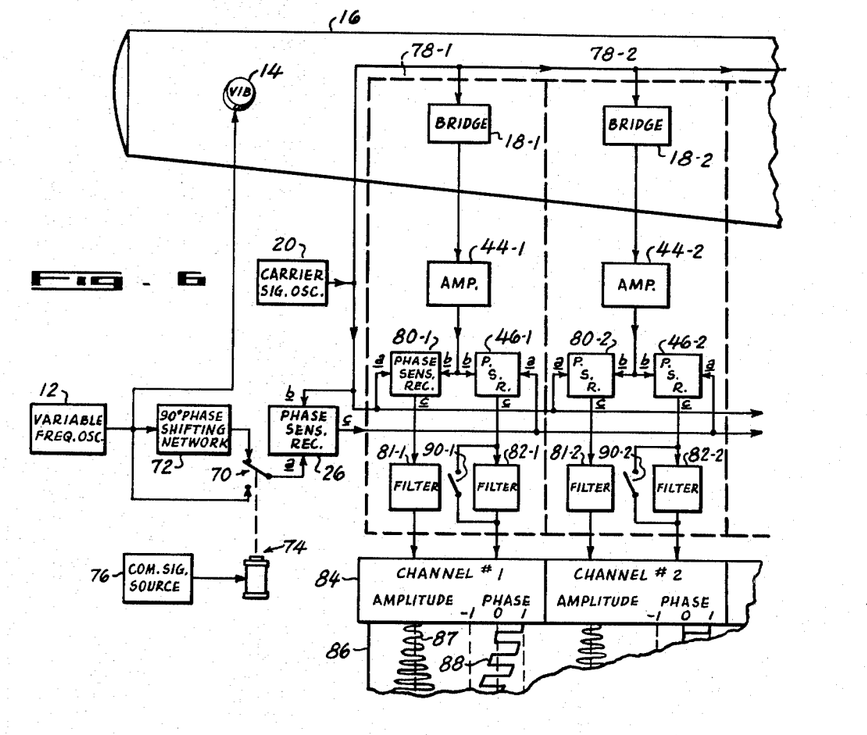
Fig. 6 is a circuit diagram in block schematic form of a mechanical resonance detecting system.

Referring now to Figure 6, there is illustrated a vibration detection system according to the present invention. Again illustrated is variable frequency oscillator 12 driving vibrator 14, impressing again its vibrations on body 16. The output signal from oscillator 12 is also applied through a 90° phase shifting network 72 to the upper contact of a relay switch, designated 70, of a relay 74 and is further applied directly to the lower contact thereof of the same switch through a single conductor. Relay switch 70 contains a movable switch arm actuated by a coil of relay 74, the coil receiving actuating signals from a commutator signal source 76. The movable switch arm of switch 70 is connected to the input $a$ terminals of phase sensitive rectifier circuit 26.

Carrier signal oscillator 20 is again illustrated with its output signal being applied to the $b$ input terminals of circuit 26 and is further applied to strain gauge bridge 18-1, included in the first vibration detection channel 18-1. Bridge 18-1, corresponding to bridge 18 of Figure 1, has its output signal amplified by amplifier 44-1, corresponding to amplifier 44 of Figure 1, the output signal of which is applied to the $b$ input terminals of a pair of phase sensitive rectifier circuits 80-1 and 46-1, circuit 46-1 corresponding to circuit 46 of Figure 1. The output signal of oscillator 20 is also applied to the $a$ input terminals of circuit 80-1 while the $c$ output terminals of circuit 26 are connected to the $a$ input terminals of rectifier circuit 46-1. The $c$ output terminals of circuits 80-1 and 46-1 are coupled to the input terminals of a pair of filters 81-1 and 82-1, respectively, the output terminals of which are connected to a multiple channel recording voltmeter 84. Recording voltmeter 84, in turn, records the output signal of filter 81-1 as a trace 87 on a recording medium 86, and further records the output signal of filter 82-1 as a trace 88 on medium 86. A shorting switch 90-1 is provided between the input and output terminals of filter 82-1.

A second vibration detection channel 78-2 is illustrated, it being similar in all respects to the detection channel 78-1 previously described. As will be observed corresponding elements in the two channels are given the same numerical designation but are followed by dash marks and digits, the digits corresponding to the element's associated channel. For this channel, as formerly the output signals of filters 81-2 and 82-2 are recorded, but not here specifically illustrated, by voltmeter 84 again on medium 86. The beginning of the third channel 78-3 is also indicated, it being similar in all respects to the two illustrated channels. As will be apparent, as many other channels similar to the illustrated ones may be utilized as required for the particular resonant investigation being conducted on elastic body 16.

The primary purpose of the system illustrated in Figure 6, is to record both amplitude and phase of induced mechanical vibrations present at a series of points or locations on an elastic body undergoing vibration. This resulting record will, for each pick-up point, allow not only a visual determination of considerable accuracy to be made of the particular frequencies wherein resonance occurs, but also the corresponding magnitudes thereof. Considering first the operation of the system as it measures and records the phase difference between the modulation component of the bridge's output signal and the vibration driving signal, as particularly directed to the first channel 78-1, it will be observed that the principal structural difference between the phase measuring portion of this channel and the device of Figure 1, is the addition here of commutator signal source 76, relay 74, and 90° phase shifting network 72.

In particular, signal source 76 produces an output signal of a substantially constant frequency, its frequency being considerably lower than the lowest output frequency produced by variable frequency oscillator 12. This output signal, in turn, is applied to the relay coil of relay 74 to alternately move the movable switch arm of switch 70 between engagement with its upper and lower contacts. With the switch arm in its lower position, then the output signal of oscillator 12 is applied without phase shift to the $a$ input terminals of phase sensitive rectifier 26 and this, in turn, corresponds exactly to the circuit of Figure 1. Thus, during this switch position, the output signal of phase sensitive rectifier circuit 26 corresponds exactly to the output signal of rectifier 26 of Figure 1 as the circuits will operate in an identical fashion. Hence, the output signal recorded by voltmeter 84 will be proportional to the cosine of the phase displacement angle.

On the other hand, however, when the relay coil is energized in its other direction, then the switch arm of switch 70 will be in its upper contact position with the result that a 90° phase shift will be afforded the output signal of oscillator 12 through network 72. In this position of switch 70, the rectifiers 26 and 46-1 will still operate as formerly except that the recorded value on medium 86 will indicate a phase difference which is a function of $(\phi + 90°)$. As is well known, the cosine of any angle $+90°$, is equivalent to minus the sine of the same angle. Thus, the recording obtained on the medium 86 during such an interval will be equal to $-\sin \phi$. This further means that if, for example, $\phi = 0°$, indicating no phase displacement, the $\cos \phi$, under such circumstances, will be substantially equal to one while the value of $-\sin \phi$ will be close to zero.

Now, as has been brought out previously, the scale of a cosine function close to 0° is greatly condensed while the sine function near 0° is substantially linear. On the other hand, at 90°, the scales are reversed from above, with the cosine function being relatively linear and the sine function being very condensed. Thus, by alternately recording the cosine and sine functions of $\phi$, whenever the displacement angle is close to 0°, the cosine scale accordingly will be relatively difficult to read with any degree of accuracy while, simultaneously therewith, the sine function will be substantially linear and hence, capable of being accurately read. In the same manner, when $\phi$ approaches 90°, the cosine value will be close to zero magnitude and hence, easily readable while the sine function will be close to one in magnitude and quite difficult to read.

At extremely low modulation frequencies, it may be found that the time constant of filter 82-1 is insufficient to properly filter the output signal of rectifier 46-1. If such occurs, then switch 90-1 may be manually closed and filter 82-1 effectively short-circuited. Then, trace 88 would be similar in appearance to signal 63′ illustrated in Figure 5. A signal of such waveshape may be evaluated by, in an approximate manner, comparing the number of carrier frequency signal negative excursions to the number of positive excursions thereof, and calculating the average or, as in Figure 5, the $V_{\phi 4}$ value thereof. Such a longitudinal type of evaluation would, under such circumstances, prove more accurate for these low frequencies than attempting to record the normally appearing output signal of filter 82-1.

Figures 7, 9:
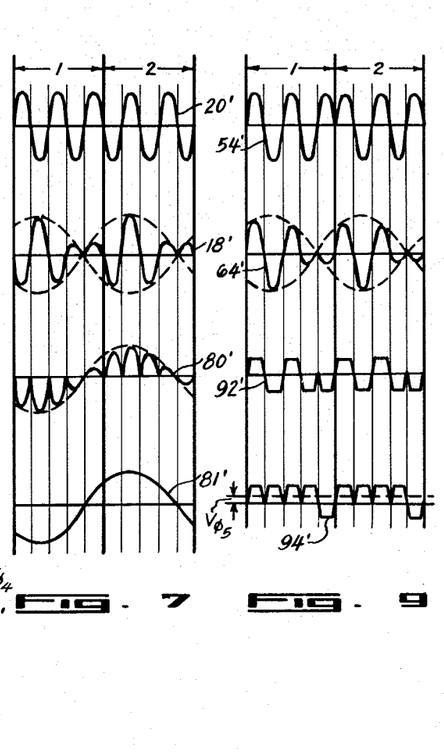
Fig. 7 is a group of signal waveforms illustrating the principles involved in the operation of the system of Fig. 6.
Fig. 9 is a group of signal waveforms illustrating the principles of operation of the device of Fig. 8.

Considering now the manner of obtaining the amplitude of the vibrations as contained in trace 87 by the operation of rectifier 80-1, reference is made to the signal waveforms illustrated in Figure 7. First illustrated is ouput signal 20', corresponding to signal 53' of Figure 5, of the carrier signal oscillator 20. Also illustrated is the output signal of bridge 18–1, here designated 18' and corresponding to signal 64' of Figure 5. The output signal of phase sensitive rectifier circuit 80–1 is indicated at 80', it being produced by the action of circuit 80–1 on its driving and driven two input signals 20' and 18', respectively. The particular configuration of signal 80', as illustrated, may be readily determined from the operation of rectifier circuits and corresponding signal waveforms previously explained in connection with Figure 5. As can be readily seen, the amplitude attained by the modulation component of signal 80' will be proportional to the amplitude of the modulation component signal 18'. Thus, the filtering of signal 80' by filter 81–1 will produce a signal, here indicated at 81', having a waveform corresponding to the modulation component of signal 18', signal 81' being the one recorded as trace 87 by voltmeter 84.

Figure 8:
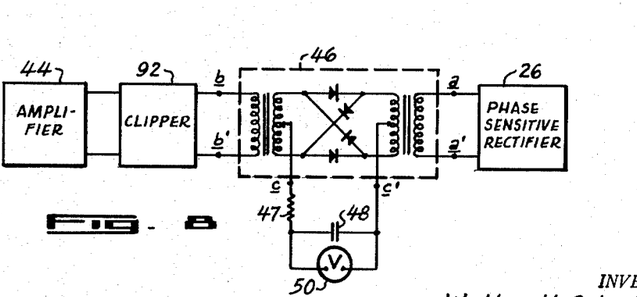
Fig. 8 is a circuit diagram, partly in block schematic form, representing another embodiment of a mechanical resonance detecting system according to the present invention.

As was pointed out previously in connection with Figure 1, voltmeter 50 must be scaled as a cosine function of the phase displacement angle, while in Figure 6, trace 88 will be alternately a sine and cosine function of the displacement. Referring now to Figure 8, there is illustrated another form of the present invention in which the voltmeter deflection will be linear with respect to the phase displacement angle. The only distinction between the circuit of Figure 8 and that illustrated in Figure 1 is that a clipper circuit 92 is inserted between the output terminals of amplifier 44 and the $b$ and $b'$ input terminals of phase sensitive rectifier circuit 46. For the purposes of convenience, only that portion of Figure 1 is again illustrated which appears between amplifier 44 and rectifier circuit 26.

The manner by which the circuit of Figure 8 acts to produce the linear relationship between output signal magnitude and phase shift may be most readily understood by reference to the signal waveforms illustrated in Figure 9. Again illustrated is signal 54', identical, for the purposes of this example, to signal 54' of Figure 5 as it appears on the $c$ and $c'$ output terminals of rectifier circuit 26. Also, again illustrated is signal 64' appearing on the output terminals of amplifier 44, signal 64' being similar here to the like designated signal in Figure 5. The output signal of clipper 92, designated here 92', is the result of signal 64' being acted on by clipper circuit 92. This circuit 92, of conventional and well-known design, serves to remove the positive and negative going portions of each of the excursions of carrier signal 64. Thus, signal 92' comprises a series of trapezoidal signal configurations, each two adjacent maximum positive and negative flat crests thereof being joined in all cases by substantially linear portions corresponding, in turn, to the linear portions of the sine wave excursions of its parent signal 64'.

Phase sensitive rectifier 46 combines signals 54' and 92' in the manner previously explained and its output signal appearing across its $c$ and $c'$ output terminals is herein illustrated at 94. The average value of signal 94, as read by voltmeter 50, after appropriate filtering thereof by the filter resistor 47 and capacitor 48, will be, in this example, of $V_{\varphi s}$ magnitude. This meter reading, as previously stated, will be a linear function of the phase shift since all of the positive and negative portions of signal 94 will be of identical magnitude and configuration.

The linear operation of the circuit of Figure 8 is illustrated in Figure 10 to be contrasted thereby with the previously described example of Figure 4 relating to the devices of Figures 1 and 2. Here, plotted along the abscissa or X-axis are found the phase shift in degree as it varies from 0° to over 450°. Along the ordinate or Y-axis is plotted the output voltage, it being at a positive maximum at a 0° phase shift, zero in magnitude at a 90° phase shift representing the resonant frequency, and a maximum negative magnitude at a 180° phase shift, with all magnitudes therebetween being linear. From 180° to 360° of phase shift $V_\varphi$ remains linear as it extends from a maximum negative to a maximum positive value.

As will be apparent to those skilled in the art, a clipper circuit corresponding to circuit 92 of Figure 8, could readily be incorporated in each of the channels illustrated in Figure 6 with the result that the phase angle would be plotted as a continuous linear function rather than the alternate cosine and sine values therein illustrated for trace 88. This, in turn, would permit the omission of signal source 76, relay 74 and the 90° phase shifting network 72, but, at the same time, would require a separate clipper circuit for each of the channels so utilized. Thus, although part of the circuitry of Figure 6 could be eliminated, the additional circuitry that must be included in each of the channels would serve, if even a reasonable number of such channels were utilized, to actually make the resulting circuit more complex than that illustrated.

I claim:

1. Apparatus for determining the characteristics of a structural body by its response to mechanical vibrations applied thereto, said apparatus comprising vibrator means for applying mechanical vibrations to said body, vibration sensing means positioned on said structural body, means for exciting said vibration sensing means with a carrier signal having a frequency higher than the frequency of said vibrations whereby said mechanical vibrations produce modulation of said carrier signal, means connected with said vibrator to obtain an electrical signal having frequency characteristics corresponding with said applied vibrations, a modulated circuit, means for applying said carrier signal and said electrical signal to said modulator for developing a modulated reference signal from said carrier frequency signal and said electrical signal, a phase sensitive rectifier circuit connected with said vibration sensing means and directly responsive to vibration modulation of said carrier signal and modulation component of said reference signal, said circuit having a first and a second pair of input terminals and a pair of output terminals, means for applying said vibration modulated carrier signal to said first pair of input terminals, and means for applying said modulated reference signal to said second pair of input terminals whereby an output signal is produced on said pair of output terminals proportional to the phase relationship therebetween, and indicating means connected with said pair of output terminals for indicating said phase relationship.

2. Apparatus for determining the characteristics of a structural body by its response to mechanical vibrations applied thereto, said apparatus comprising vibrator means for applying mechanical vibrations to said body, vibration sensing means positioned on said structural body, means for exciting said vibration sensing means with a carrier signal having a frequency higher than the frequency of said vibrations whereby said mechanical vibrations produce modulation of said carrier signal, means connected with said vibrator to obtain an electrical signal having frequency characteristics corresponding with said applied vibrations, circuit means responsive to said carrier signal and said electrical signal for developing a modulated reference signal from said carrier signal and said electrical signal and a signal responsive circuit connected with said vibration sensing means and directly responsive to vibration modulation of said carrier signal and modulation component of said reference signal, said circuit including first and second input transformers each having secondary windings connected to a plurality of rectifying elements arranged in a bridge circuit whereby an output signal is produced which is proportional to the phase relationship between said vibration modulation of said carrier signal and modulation of said reference signal, and an indicator connected with said signal responsive circuit for indicating said phase relationship.

3. Apparatus for determining the characteristics of a structural body by its response to mechanical vibrations applied thereto, said apparatus comprising a vibrator, means for producing an electrical signal adapted to drive said vibrator, vibration sensing means positioned on said structural body, means for exciting said vibration sensing means with a carrier signal having a frequency higher than the frequency of said vibrations whereby said mechanical vibrations produce modulation of said carrier signal, circuit means responsive to said carrier and said electrical signal for developing a modulated reference signal from said carrier frequency signal and said electrical signal, a signal responsive circuit connected with said vibration sensing means and directly responsive to vibration modulation of said carrier signal and modulation component of said reference signal, said circuit having polarity responsive switching means coupled with a first pair of input terminals and switching contacts coupled with a second pair of input terminals, means for applying said vibration modulated carrier signal to said first pair of input terminals, and means for applying said modulated reference signal to said second pair of input terminals whereby the signal applied to said first pair of input terminals serves to control the polarity with which the signal applied to said second pair of input terminals is passed to a pair of output terminals to produce an output signal proportional to the phase relationship therebetween, and an indicator connected with said circuit means for indicating said phase relationship.

4. Apparatus for determining the characteristics of a structural body by its response to mechanical vibrations applied thereto, said apparatus comprising a vibrator arranged to impart vibrations to said body, means for driving said vibrator, strain sensing means positioned on said structural body, means for exciting said strain sensing means with a carrier signal having a frequency higher than the frequency of said vibrations whereby said mechanical vibrations produce modulation of said carrier signal at the output of said strain sensing means, means for limiting positive and negative portions of said modulated carrier signal, means connected with said vibrator to obtain an electrical signal in accordance with vibrations applied by said vibrator, circuit means responsive to said carrier signal and said electrical signal for developing a modulated reference signal from said carrier frequency signal and said electrical signal, a phase sensitive rectifier circuit connected with said vibration sensing means and said circuit means and directly responsive to vibration modulation of said carrier signal and modulation component of said reference signal, said circuit having a first and a second pair of input terminals and a pair of output terminals, means for applying said limited vibration modulated carrier signal to said first pair of input terminals, and means for applying said modulated reference signal to said second pair of input terminals whereby an output signal is produced on said pair of output terminals linearly proportional to the phase relationship therebetween, and an indicator connected to said pair of output terminals.

5. Apparatus for determining the characteristics of a structural body by its response to mechanical vibrations applied thereto, said apparatus comprising a vibrator positioned on said body, an electrical signal for driving said vibrator, vibration sensing means positioned on said structural body, means for exciting said vibration sensing means with a carrier signal having a frequency higher than the frequency of said vibrations whereby said mechanical vibrations produce modulation of said carrier signal, phasing shifting means for producing alternate 0° and 90° phase shifts respectively to said electrical signal, circuit means connected with said phase shifting means and responsive to said carrier signal for developing a modulated reference signal from said carrier frequency signal and said electrical signal, a phase sensitive rectifier circuit responsive to said vibration sensing means and directly responsive to vibration modulation of said carrier signal and modulation component of said reference signal, said phase sensitive rectifier circuit having a first and a second pair of input terminals and a pair of output terminals, means for applying said vibration modulated carrier signal to said first pair of input terminals, means for applying said modulated reference signal to said second pair of input terminals whereby an output signal is produced on said pair of output terminals alternately representing a function of the cosine and sine, respectively, of the phase relationship therebetween, and means connected with said pair of output terminals for recording said phase relationship.

6. Apparatus for determining the characteristics of a structural body by its response to mechanical vibrations applied thereto, said apparatus comprising a vibrator, electrical generating means for driving said vibrator, vibration sensing means positioned on said structural body, means for exciting said vibration sensing means with a carrier signal having a frequency higher than the frequency of said vibrations whereby said mechanical vibrations produce modulation of said carrier signal, means connected with said vibrator to obtain an electrical signal in accordance with said applied vibrations, phase shifting means for producing alternate 0° and 90° phase shifts to said electrical signal, circuit means connected with said phase shifting means and responsive to said carrier signal for developing a modulated reference signal from said carrier frequency signal and said electrical signal, a first phase sensitive rectifier circuit associated with said vibration sensing means and directly responsive to vibration modulation of said carrier signal and the modulation component of said reference signal, said phase sinsitive rectifier circuit having a first and a second pair of input terminals and a pair of output terminals, means for applying said vibration modulated carrier signal to said first pair of input terminals, means for applying said modulated reference signal to said second pair of input terminals whereby an output signal is produced on said pair of output terminals alternately representing a function of the cosine and sine, respectively, of the phase relationship therebetween, a second phase sensitive rectifier circuit having a first and a second pair of input terminals and a pair of output terminals, means for applying said vibration modulated carrier signal to said first pair of input terminals, means for applying said carrier signal to said second pair of input terminals, and filtering means coupled to said output terminals to produce an output signal representing the amplitude of said vibrations, and indicating means for separately exhibiting said phase relationship and said amplitude of vibration.

7. Apparatus for determining the characteristics of a structural body by its response to mechanical vibrations applied thereto comprising electrical generating means for producing a first signal, vibrator means connected with said electrical means for producing vibrations applied to said structural body, a carrier signal, means responsive to said carrier signal and vibrations of said body for producing a second signal modulated in accordance with said vibrations, modulator circuit means connected with said electrical means and said carrier signal for modulating said carrier by said first electrical signal thereby, developing a reference signal, and circuit comparing means responsive to said second signal and said reference signal for generating an output signal indicating the phase relationship between vibrations applied to said structural body and response of said body to said vibrations, means responsive to said circuit comparing means for indicating the phase relationship between applied vibrations and the response of said body to said applied vibrations.

8. Apparatus for determining the characteristics of a structural body by its response to mechanical vibrations applied thereto, said apparatus comprising electrical means for producing a first signal, vibrator means connected with said electrical means for producing vibrations applied to said structural body, a carrier signal, means responsive to said carrier and to vibrations of said body for producing a carrier signal modulated in accordance with said vibrations, modulator circuit means responsive to said first signal and said carrier signal for developing a carrier reference signal modulated by said first signal, detecting circuit means responsive to said carrier signal modulated by said vibrations and said carrier reference signal for directly producing an output proportional to the phase relationship between said signals, and indicating means responsive to said detecting circuit means for indicating the response of the structural body to the applied vibrations.

9. A device for indicating phase relationship between a first signal and the modulation component of a modulated second signal which second signal includes a carrier and a modulation frequency component, said device comprising first and second phase sensitive rectifier means with each of said means having first and second pairs of input terminals and a pair of output terminals, means for applying said first signal to the first pair of input terminals of the first phase senstitive rectifier means, means for applying said carrier to the second pair of input terminals of the first phase sensitive rectifier means whereby a modulated output signal is produced on said pair of output terminals, means for applying said modulated output signal to the first pair of input terminals of the second phase sensitive rectifier means, means for applying said modulated second signal to the second pair of input terminals of the second phase rectifier means whereby a signal is produced on said pair of output terminals proportional to the phase relationship between said first signal and said modulation component of said second signal, and an indicator responsive to said second phase sensitive rectifier means for indicating the phase relationship between said first signal and the modulated component of said second signal.

References Cited in the file of this patent

UNITED STATES PATENTS

| | | |
|---|---|---|
| 2,025,158 | Cowan | Dec. 24, 1935 |
| 2,209,064 | Nyquist | July 23, 1940 |
| 2,305,268 | Minor | Dec. 15, 1942 |
| 2,412,240 | Williams et al. | Dec. 10, 1946 |

FOREIGN PATENTS

| | | |
|---|---|---|
| 636,103 | Great Britain | Apr. 26, 1950 |

OTHER REFERENCES

Electronics, March 1949, pp. 86–91, by Willson.